(12) United States Patent
Jo

(10) Patent No.: US 10,184,071 B2
(45) Date of Patent: Jan. 22, 2019

(54) ADHESIVE TAPE FOR CONNECTING SECONDARY BATTERY ELECTRODES

(71) Applicant: Eun Mi Jo, Daegu (KR)

(72) Inventor: Eun Mi Jo, Daegu (KR)

( * ) Notice: Subject to any disclaimer, the term of this patent is extended or adjusted under 35 U.S.C. 154(b) by 0 days.

(21) Appl. No.: 15/111,240

(22) PCT Filed: May 23, 2014

(86) PCT No.: PCT/KR2014/004630
§ 371 (c)(1),
(2) Date: Jul. 13, 2016

(87) PCT Pub. No.: WO2015/178521
PCT Pub. Date: Nov. 26, 2015

(65) Prior Publication Data
US 2016/0333226 A1 Nov. 17, 2016

(51) Int. Cl.
*C09J 7/02* (2006.01)
*H01M 10/04* (2006.01)
(Continued)

(52) U.S. Cl.
CPC .......... *C09J 7/0264* (2013.01); *C09J 7/0246* (2013.01); *C09J 133/00* (2013.01); *C09J 133/06* (2013.01);
(Continued)

(58) Field of Classification Search
CPC ...... C09J 7/0264; C09J 7/0282; C09J 7/0285; C09J 7/0275; C09J 7/0246; C09J 133/00;
(Continued)

(56) References Cited

U.S. PATENT DOCUMENTS 6,319,442 B1 * 11/2001 Downs ................. B65H 37/002
264/132
6,333,117 B1 * 12/2001 Sumi ...................... B32B 25/20
428/40.1
(Continued)

FOREIGN PATENT DOCUMENTS

| KR | 100819183 B1 | 4/2008 |
|---|---|---|
| KR | 1020100099064 A | 9/2010 |
| KR | 1020120102328 A | 9/2012 |
| KR | 1020130048812 A | 5/2013 |
| KR | 1020140069900 A | 6/2014 |

OTHER PUBLICATIONS

International Search Report dated Feb. 23, 2015 for PCT/KR2014/004630 and English translation.

*Primary Examiner* — Patricia L. Nordmeyer
(74) *Attorney, Agent, or Firm* — Lucas & Mercanti, LLP

(57) ABSTRACT

Disclosed herein is an adhesive tape for connecting secondary battery electrodes which prevents an adhesive from leaking to electrodes during electrode processing processes even though the adhesive tape for connecting the electrodes is adhered or which prevents the adhesive from leaking to the electrodes wound near the adhesive tape in a case that the electrode substrates are wound in a roll type in order to continuously connect electrode substrates of the front and rear ends during a secondary battery electrode manufacturing process, thereby preventing the electrodes from being damaged and from being unacceptable. The adhesive tape for connecting secondary battery electrodes comprises: a base film formed in a thin plate type and made of a synthetic resin; and an adhesive layer formed on the lower surface of the base film by applying an adhesive to the central portion of the base film, except the left and right peripheries.

3 Claims, 3 Drawing Sheets

(51) Int. Cl.
*C09J 133/00* (2006.01)
*C09J 133/06* (2006.01)

(52) U.S. Cl.
CPC ... *H01M 10/0431* (2013.01); *H01M 10/0468* (2013.01); *C09J 2201/28* (2013.01); *C09J 2203/33* (2013.01); *C09J 2423/106* (2013.01); *C09J 2433/00* (2013.01); *C09J 2467/006* (2013.01); *C09J 2479/086* (2013.01)

(58) Field of Classification Search
CPC .............. C09J 133/06; C09J 2203/33; C09J 2479/086; C09J 2467/006; C09J 2433/00; C09J 2423/106; C09J 2201/28; H01M 10/0468; H01M 10/0431; Y10T 428/14; Y10T 428/1481
See application file for complete search history.

(56) References Cited

U.S. PATENT DOCUMENTS

| | | | |
|---|---|---|---|
| 6,649,239 B2 * | 11/2003 | Donahue | B42D 5/003 428/192 |
| 8,163,365 B2 * | 4/2012 | Weiner | B31D 1/021 428/201 |
| 8,632,908 B2 * | 1/2014 | Cho | H01M 2/021 29/623.1 |
| 2009/0162595 A1 * | 6/2009 | Ko | B05C 5/0254 428/41.9 |
| 2010/0221585 A1 * | 9/2010 | Terashima | C09J 7/02 429/8 |

* cited by examiner

ADHESIVE TAPE FOR CONNECTING SECONDARY BATTERY ELECTRODES

CROSS-REFERENCE TO RELATED APPLICATIONS

This application is a 371 of PCT/KR2014/004630, filed May 23, 2014, the content of which is incorporated herein by reference.

BACKGROUND OF THE INVENTION

Field of the Invention

The present invention relates to an adhesive tape for connecting secondary battery electrodes, and more particularly, to an adhesive tape for connecting secondary battery electrodes which prevents an adhesive from leaking to electrodes during electrode processing processes even though the adhesive tape for connecting the electrodes is adhered or which prevents the adhesive from leaking to the electrodes wound near the adhesive tape in a case that the electrode substrates are wound in a roll type in order to continuously connect electrode substrates of the front and rear ends during a secondary battery electrode manufacturing process, thereby preventing the electrodes from being damaged and from being unacceptable.

Background Art

In general, a secondary battery is a rechargeable battery which can be continuously used through recharging even after it converts energy into electric energy because using a charging material, which is repeatable the oxidation-reduction action between an electric current and a material several times, differently from a first battery which is wasted when it is used once.

Most of secondary batteries used in electronic handheld devices, such as mobile phones, digital cameras or others, are configured such that an anode substrate and a cathode substrate respectively having active material layers are wound together with a separator and are inserted into a battery housing and an electrolyte is injected into the housing. Such secondary batteries use the electrochemical reaction generated between molecules of the electrolyte and active materials when the anode and the cathode are connected with each other.

As the secondary batteries, there are nickel-cadmium batteries, nickel-hydride batteries, nickel-zinc batteries, lithium-ion batteries, lithium-polymer batteries and lithium-sulfur batteries according to which materials are used the anode, the cathode or the electrolyte, and the secondary batteries may be made in the form of an angular shape, a cylindrical shape or a thin plate.

The active material is coated on both sides or one side of the electrode substrate supplied from an electrode substrate roll in even thickness, and then, is dried to be fixed. The electrode substrate on which an active material layer is formed is pressed by a roll heated at temperature of 80° C. to 150° C. to be formed into a basic electrode structure. The electrode structure is wound on a winding roll, and then, passes through a predetermined process in order to be used in a secondary battery assembling process.

In this instance, in order to continuously make the electrode of the secondary battery when the electrode of the secondary battery is made into a roll type, a termination end of an electrode substrate roll of the front end and a start end of an electrode substrate roll of the rear end are connected with each other, and in this instance, they are generally connected by an adhesive tape whose lower surface is coated with an adhesive.

However, in a case that the electrode substrate rolls are connected with each other using the conventional adhesive tape for connecting secondary battery electrodes, the adhesive coated on the lower surface of the adhesive tape leaks out of the adhesive tape by heat or pressure while the adhesive tape goes through various processes, such as heating or pressing, and it causes production of bad secondary battery electrodes. Alternatively, the adhesive leaks to the electrode substrate part wound near to the electrode substrate on which the adhesive tape is adhered when the electrode substrates are rolled after the connecting work, and it causes damage of the electrode substrates which are wound once or more at the part where the adhesive tape is adhered.

Moreover, because the leaking adhesive may be adhered onto various processing devices, such as a press or a roll, the processing devices may break down. So, in order to prevent breakdown of the processing devices, a worker must frequently clean or maintain the devices, but it deteriorates production efficiency.

Furthermore, in a case that the electrode substrate rolls are connected with each other using the conventional adhesive tape and the electrode structure is formed through the required processing process and is wound on the winding roll, both ends of the connected part where the electrode substrate rolls are connected using the adhesive tape are cut. However, in this instance, because not only the part where the adhesive tape is adhered but also the area where the leaking adhesive is exposed are cut to be abandoned, the electrodes are wasted.

Additionally, in the case that the electrode substrate rolls are connected with each other using the conventional adhesive tape, in the process of winding the electrode substrate rolls on the winding roll after passing through the post-processing, when the both ends of the connected part must be cut. However, because the processing device cannot automatically recognize the part where the adhesive tape is adhered, the worker must check and handle the electrode substrate rolls one by one and it deteriorates production efficiency.

SUMMARY OF THE INVENTION

Accordingly, the present invention has been made in view of the above-mentioned problems occurring in the prior art, and it is an object of the present invention to provide an adhesive tape for connecting secondary battery electrodes, which does not cause production of bad secondary battery electrodes because an adhesive coated on an adhesive tape does not leak out even though the adhesive tape for connecting secondary battery electrodes is used to connect an electrode substrate roll of a front end with an electrode substrate roll of a rear end in a secondary battery electrode manufacturing process, and, which can prevent deterioration in production efficiency due to frequent cleaning or maintenance because the adhesive does not leak out and does not have any bad influence on processing devices.

It is another object of the present invention to provide an adhesive tape for connecting secondary battery electrodes, which can make a sensor sense a part where the adhesive tape is adhered when the part where the adhesive tape is adhered is cut after the electrode substrate roll of the front end and the electrode substrate roll of the rear end are connected with each other and pass through the required electrode processing processes in the secondary battery electrode manufacturing process, thereby enhancing production efficiency through automated cutting work.

To accomplish the above object, according to the present invention, there is provided an adhesive tape for connecting secondary battery electrodes including: a base film made with synthetic resin of a thin plate type; and an adhesive layer which is formed on a lower surface of the base film and is configured such that an adhesive is coated on the central portion of the base film except peripheries of the base film.

In this instance, the base film is 5 µm to 200 µm in thickness, and is made of one of polyethylene terephthalate (PET), polyethylene naphthalate (PEN), oriented polypropylene (OPP) and polyimide (PI).

Meanwhile, the adhesive is an acryl-based adhesive, the adhesive layer is configured such that the adhesive is coated on the central portion of the lower surface of the base film at width which is 50% to 99% of the full lateral width of the base film in order to keep adhesive power and prevent the adhesive from leaking out. Moreover, the adhesive layer is 3 µm to 50 µm in thickness.

Furthermore, the adhesive layer is configured such that a sticking agent is additionally coated on right and left peripheries of the base film where the adhesive is not coated, and the sticking agent is an acryl-based sticking agent with adhesive power of 50 g/25 mm to 2000 g/25 mm.

Additionally, the adhesive tape for connecting secondary battery electrodes further includes a release sheet or a release film which is located on the lower surface of the adhesive layer and has the same width as the base film.

In the meantime, the adhesive tape for connecting secondary battery electrodes further includes a color printed layer which is formed between the lower surface of the base film and an upper surface of the adhesive layer and has a color coated to be distinguished by a sensor, so that a sensor senses the part where the adhesive tape is adhered to make cutting work automated.

In addition, the adhesive tape for connecting secondary battery electrodes further includes a silicon hardening resin layer which is formed on the upper surface of the base film and is hardened by ultraviolet rays after silicon resin is coated.

In this instance, in order to distribute and sell the adhesive tape according to the present invention in the state where the adhesive layer is formed excluding the release sheet or the release film and the base film is wound in a roll type, the adhesive tape for connecting secondary battery electrodes further includes a base film cover layer which is formed on the upper surface of the base film and is configured such that paraffin resin or silicon resin is coated and dried.

The adhesive tape for connecting secondary battery electrodes according to the present invention which has an adhesive layer formed not on the entire of the lower surface of the base film but on the central portion except peripheries of the lower surface of the base film in order to prevent the adhesive from leaking out of the base film by heat or pressure while passing through various processes, such as heating or pressing, thereby preventing production of bad secondary battery electrodes or bad influences on processing devices.

Additionally, after the electrode substrate rolls are connected with each other using the adhesive tape for connecting secondary battery electrodes according to the present invention and pass through the required electrode processing processes, when the part of the electrode substrate rolls where the adhesive tape is adhered is cut, only the part where the adhesive tape is adhered is cut or the right and left peripheries of the adhesive tape where the adhesive layer is not formed are cut without needing to cut the outer part of the right and left side of the adhesive tape. Therefore, the adhesive tape for connecting secondary battery electrodes according to the present invention can minimize cut and wasted parts of the electrode substrate rolls.

In addition, after the electrode substrate rolls are connected with each other using the adhesive tape for connecting secondary battery electrodes according to the present invention and pass through the required electrode processing processes, when the part of the electrode substrate rolls where the adhesive tape is adhered is cut, the color printed layer formed on the adhesive tape for connecting secondary battery electrodes can be sensed by a sensor. Therefore, the adhesive tape for connecting secondary battery electrodes according to the present invention can enhance production efficiency because cutting work is carried out while a sensor senses the part where the adhesive tape is adhered through the automated process, even though the worker does not check the part where the adhesive tape is adhered one by one.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1A:
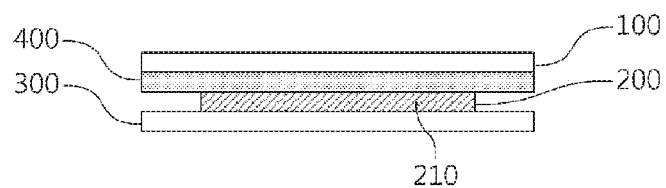
FIG. 1(a) and FIG. 1(b) are sectional views of an adhesive tape for connecting secondary battery electrodes according to a first preferred embodiment of the present invention.
Figure 1B:
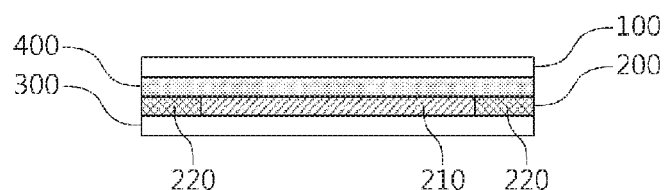

FIG. 1 is a sectional view of an adhesive tape for connecting secondary battery electrodes according to a first preferred embodiment of the present invention.

Referring to FIG. 1(a), the adhesive tape for connecting secondary battery electrodes according to the first preferred embodiment of the present invention includes: a base film 100 made with resin of a thin plate type; a color printed layer 400 formed on the lower surface of the base film 100; an adhesive layer 200 formed on the lower surface of the color printed layer 400; and a release sheet 300 located on the lower surface of the base film 100.

In this instance, the base film 100 may be manufactured using various materials, but it is not good to manufacture the base film 100 using metallic materials because a thin film metal series like aluminum may generate static electricity by friction while passing through various secondary battery electrode manufacturing processes and the static electricity may make secondary battery electrodes bad.

Therefore, it is good to manufacture the base film 100 using synthetic resin not to have any influence on the secondary battery manufacturing processes. In consideration of processability or durability, it is preferable that the base film 100 be made of polyethylene terephthalate (PET), polyethylene naphthalate (PEN), oriented polypropylene (OPP), polyimide (PI) or the like.

Moreover, there is a difference in thickness of the base film 100 according to the materials of the base film 100. In order to minimize the influence on the secondary battery electrode manufacturing processes, in a case that the base film 100 is made of a soft material with the range of 10 μm to 200 μm, the base film 100 is formed thick, but in a case that the base film 100 is made of a relatively hard material, the base film 100 is formed relatively thin.

In the meantime, a color printed layer 400, on which a predetermined color is coated, is formed on the lower surface of the base film 100 to be distinguished by a sensor. One of various sensors, such as an infrared ray sensor, an ultraviolet ray sensor, a color sensor and other, may be adopted if the sensors can sense a specific color and react to the color.

In general, the infrared sensor is universally used. In a case that the infrared sensor is adopted, color coated on the color printed layer 400 is generally white or green, and may be white-mixed green. Furthermore, in order to express white-mixed green, white color is coated and dried on the upper surface of the base film 100, and then, green color is coated on the white color, so that the color printed layer 400 is coated doubly.

As described above, because the color printed layer 400 is formed on the lower surface of the base film 100, in the process of cutting the part where the adhesive tape for connecting secondary battery electrodes is adhered after an electrode substrate 10 on which the adhesive tape is adhered sequentially passes through required processing processes, a worker doesn't need to check electrode substrates 10 one by one, and an automated manufacturing process to carry out cutting work after the sensor senses the part where the adhesive tape for connecting secondary battery electrodes is adhered can be prepared to enhance production efficiency.

Moreover, it is preferable that the base film 100 be made of a transparent material or a translucent material so that the sensor can excellently sense the color printed layer 400 formed on the lower surface of the base film 100.

Meanwhile, the adhesive layer 200 on which an adhesive 210 is coated is formed on the lower surface of the color printed layer 400. The adhesive layer 200 is formed in such a way that the adhesive 210 is coated not on the entire of the lower surface of the color printed layer 400 but on the central portion except upper, lower, right and left peripheries of the color printed layer 400.

As described above, because the adhesive 210 is coated only on the central portion except the upper, lower, right and left peripheries of the color printed layer 400, the adhesive 210 does not leak out of the adhesive tape even though the adhesive tape adhered on the electrode substrate 10 is heated or pressed during various processing processes, so as to prevent faulty electrodes. The thickness of the adhesive 210 coated on the color printed layer 100 is different according to circumstances. If the thickness of the adhesive layer 200 is about 3 μm to 50 μm, the adhesive 210 is coated on the lower surface of the color printed layer 400 such that the lateral width of the adhesive layer 200 to be formed is 50% to 99% of the full lateral width of the adhesive tape. Therefore, the adhesive tape has blank spaces of 0.5% to 25% at right and left peripheries of the lower surface thereof.

That is, if the width of the adhesive tape for connecting secondary battery electrodes is 10 cm, the adhesive 210 is coated at width of 5 cm to 9.9 cm so that the adhesive tape has the blank spaces of 0.5 mm to 25 mm at right and left sides.

In the case that the width of the adhesive tape for connecting secondary battery electrodes is 10 cm, it is preferable that the adhesive 210 be coated at width of about 9 cm so that the adhesive tape has the blank spaces of about 5 mm at the right and left sides thereof. The coated width of the adhesive 210 is the minimum width to firmly connect the electrode substrates with each other.

Additionally, it is preferable that the adhesive 210 to form the adhesive layer 200 be an acryl-based adhesive with high adhesive power to prevent the adhesive tape from being separated during various processing processes of the connected electrode substrates 10.

The release sheet 300 is located beneath the adhesive layer 200. The upper surface of the release sheet 300 is coated with silicon resin so that the release sheet 300 is not perfectly adhered to the adhesive 210 of the adhesive layer 200. Therefore, the release sheet 300 is removed from the adhesive layer 200 when the electrode substrates 10 are connected with each other to adhere the adhesive tape to the electrode substrates 10. In addition, the release sheet 300 has the same width as the base film 100 to protect the base film 100 and the adhesive layer 200.

Moreover, in lieu of the release sheet 300, a release film may be used. Alternatively, the adhesive tape may be an OPP roll tape which is widely used in practical life without using the release sheet 300 or the release film.

In the meantime, the peripheries of the lower surface of the color printed layer 400 on which the adhesive 210 is not coated may be left without any treatment, but as shown in FIG. 1(*b*), a sticking agent 220 may be coated on the peripheries of the color printed layer 400 to form the adhesive layer 200.

The sticking agent 220 is weaker in adhesive power than the adhesive 210, and it is good to use an acryl-based adhesive mainly containing acrylic polymers in which acrylic monomers are polymerized. Furthermore, it is preferable that the sticking agent 220 is removable such that the right and left peripheries of the adhesive tape on which the sticking agent 220 is coated can be easily separated when there is a need to separate the adhesive tape after the adhesive tape is adhered on the electrode substrates 10, thereby minimizing a part abandoned due to damage of the electrodes.

In other words, while required processing processes are carried out after the adhesive tape for connecting secondary battery electrodes is adhered on the electrode substrates 10, the base film 100 and the color printed layer 400 are firmly adhered on the electrode substrates 10 not to disturb the peripheries which are not coated with the adhesive 210. In the step of cutting the parts of the electrode substrates 10 on which the adhesive tape is adhered, in a case that not the outer parts of the right and left peripheries of the base film 100 and the color printed layer 400 but the inner parts of the peripheries of the base film 100 and the color printed layer 400 are cut, the remaining parts of the peripheries of the base film 100 and the color printed layer 400 remaining on the electrode substrates 10 after cutting can be cleanly separated from the electrode substrates 10.

As described above, the sticking agent 220 is the acryl-based sticking agent with adhesive power of about 50 g to 2000 g/25 mm which is high in initial adhesive power but low in final adhesive power so as to be easily removed. It is preferable that the adhesive 210 be coated at uniform thickness of 5 μm to 50 μm so that the adhesive layer 200 has uniform thickness.

Figure 3A:
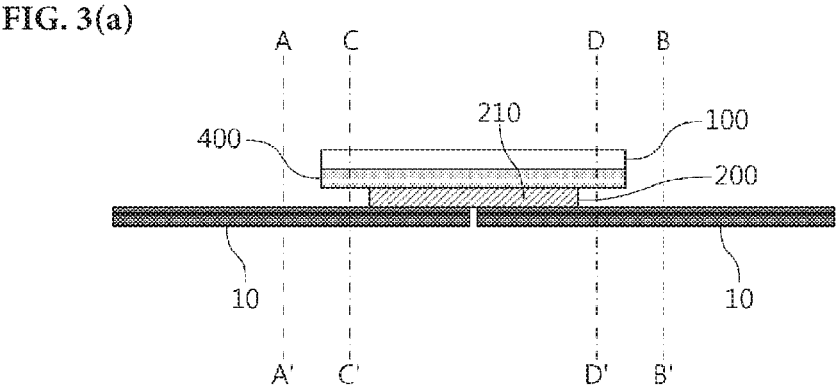
FIG. 3(a) and FIG. 3(b) are views showing an example that the adhesive tape for connecting secondary battery electrodes according to the present invention is used.

FIG. 3(a) illustrates an example that the adhesive tape for connecting secondary battery electrodes according to the present invention is used.

Referring to FIG. 3(a), in order to connect a termination end of the electrode substrate 10 of the front end and a start end of the electrode substrate 10 of the rear end with each other, the adhesive tape for connecting secondary battery electrodes is adhered to the electrode substrates 10. After the release sheet 30 disposed on the bottom end of the adhesive layer 200 is removed, the adhesive layer 200 is adhered on the electrode substrates to be uniformly located on the electrode substrates of the front end and the rear end.

In this instance, because the adhesive layer 200 is not formed on the entire of the lower surface of the color printed layer 400 but on the central portion except the right and left peripheries of the color printed layer 400, it remarkably lowers the danger to have a bad influence on the electrode substrates 10 or processing devices due to a leak of the adhesive 210 of the adhesive layer 200 by heat or pressure while the electrode substrates 10 are processed while or after the adhesive tape is adhered on the electrode substrates.

The adhesive tape for connecting secondary battery electrodes is generally adhered on any one of the upper surface and the lower side of the electrode substrate 10, but if necessary, may be adhered on both sides of the electrode substrate 10. In this instance, in order to carry out cutting work later, it is necessary to coincide positions of the adhesive tapes adhered on the upper surface and the lower side.

After the electrode substrate 10 of the front end and the electrode substrate 10 of the rear end are connected with each other using the adhesive tape for connecting secondary battery electrodes according to the present invention, required processing processes are sequentially carried out. After the processing processes, cutting work to cut and separate the electrode substrate 10 of the front end and the electrode substrate 10 of the rear end from each other must be carried out. In this instance, in a case that the adhesive layer 200 is formed on the entire of the lower surface of the color printed layer 400, because the electrode substrates must be cut based on the outer part of the right and left peripheries of the adhesive tape, for instance, the line of A-A' and the line of B-B' in FIG. 3, in consideration of the leaking adhesive 210, usable parts of the electrode substrates 10 are also cut off. Alternatively, in a case that the electrode substrates 10 are wound in a roll type and the neighboring electrode substrate 10 is damaged, all of the electrode substrates 10 wound once or more must be cut off and wasted.

Therefore, as described in the preferred embodiment of the present invention, the electrode substrates are cut based on the inner part of the right and left peripheries of the base film 100 and the color printed layer 400 on which the adhesive 210 is not coated, for instance, the line of C-C' and the line of D-D' in FIG. 3, so as to minimize waste of the electrode substrates 10. As described above, even though the sticking agent 220 is coated on the right and left peripheries of the base film 100, the electrode substrates can be used again and waste of the electrode substrates can be minimized because the base film 100 remaining after the cutting work is removed with ease.

Moreover, because the color printed layer 400 which is sensible by the sensor is formed on the lower surface of the base film 100, the cutting work can be carried out in series of the automated process after the various processing processes of the electrode substrates 10.

Meanwhile, FIG. 2 is a sectional view of an adhesive tape for connecting secondary battery electrodes according to a second preferred embodiment of the present invention.

Figure 2A:
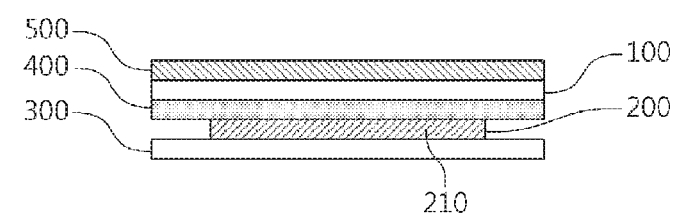
FIG. 2(a) and FIG. 2(b) are sectional views of an adhesive tape for connecting secondary battery electrodes according to a second preferred embodiment of the present invention.

Referring to FIG. 2(a), the adhesive tape for connecting secondary battery electrodes according to the second preferred embodiment of the present invention includes: a base film 100 made with resin of a thin film type; a silicon hardening resin layer 500 formed on an upper surface of the base film 100; a color printed layer 400 formed on a lower surface of the base film 100; an adhesive layer 200 formed on a lower surface of the color printed layer 400; and a release sheet 300 located on the lower surface of the base film 100.

In this instance, the silicon hardening resin layer 500 is formed to protect the base film 100 and minimize pollution or a bad influence of the electrode substrates 10 by the adhesive tape for connecting secondary battery electrodes.

The silicon hardening resin layer 500 is formed such that silicon resin is coated on the upper surface of the base film 100 and is hardened using ultraviolet rays, and has a minimal thickness so that the color printed layer 400 located on the lower surface of the base film 100 can be easily sensed by the sensor.

FIG. 4 illustrates another example that the adhesive tape for connecting secondary battery electrodes according to the present invention is used.

Figure 4A:
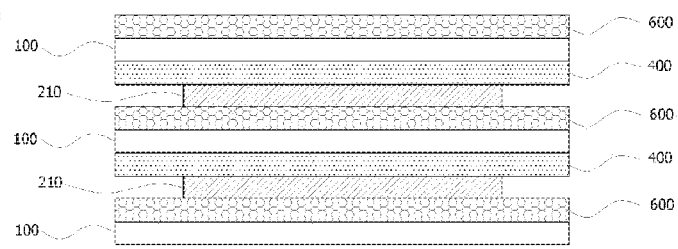
FIG. 4(a) and FIG. 4(b) are views showing another example that the adhesive tape for connecting secondary battery electrodes according to the present invention is used.
Figure 4B:
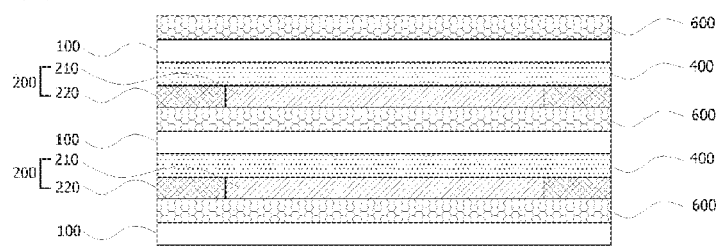

FIG. 4(a) illustrates that the adhesive layer 200 consists of only the adhesive 210, and FIG. 4(b) illustrates that the adhesive layer 200 consists of the adhesive 210 and the sticking agent 220.

In order to wind the adhesive tape in a roll type, it is preferable to additionally form a base film cover layer 600 on the upper surface of the base film so that the upper surfaces of the adhesive layer 200 and the base film 100 do not have any influence on each other even though the adhesive layer 200 gets in direct contact with the upper surface of the base film 100 after the release sheet or the release film is removed.

In the case that the adhesive tape is formed in the roll type, a plurality of unit adhesive tapes are stacked up, and in this instance, in order to release the rolled adhesive tape by one sheet, the base film cover layer 600 which covers the adhesive layer and the upper surface of the base film of another adhesive tape not to have any influence from each other is essentially needed.

Meanwhile, as described in the first preferred embodiment, the base film 100 is made of one of various synthetic resin materials, such as polyethylene terephthalate (PET), polyethylene naphthalate (PEN), oriented polypropylene (OPP), polyimide (PI) or the like. In this instance, because the color printed layer 400 is formed on the lower surface of the base film 100, the base film 100 must be manufactured as transparent as possible so that the sensor can easily sense the color printed layer 400.

Figure 2B:
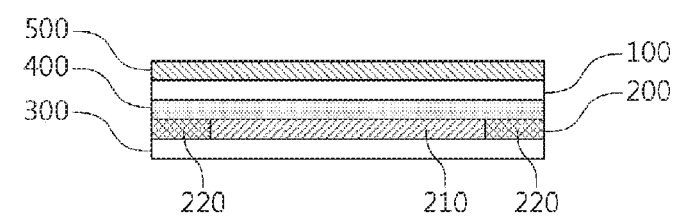

Additionally, the adhesive layer 200 and the release sheet 300 are the same as those of the first preferred embodiment shown in FIG. 1. As shown in FIG. 2(b), the adhesive layer 200 is formed such that the adhesive 210 is coated at the central portion of the color printed layer 400 and the sticking agent 220 is coated at the right and left peripheries of the color printed layer 400.

Figure 3B:
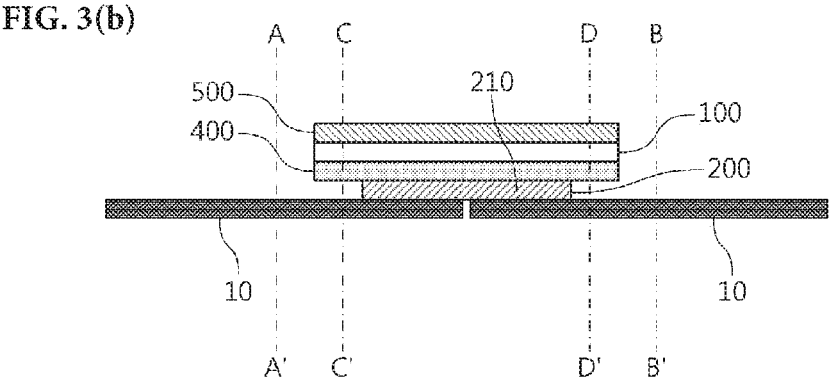

Moreover, FIG. 3(b) illustrates another example that the adhesive tape for connecting secondary battery electrodes according to the present invention is used, and description of FIG. 3(b) will be omitted because FIG. 3(b) is similar to FIG. 3(a).

While the present invention has been particularly shown and described with reference to exemplary embodiments thereof, it is not to be restricted by the embodiments but only by the appended claims. It is to be appreciated that those of ordinary skill in the art can change or modify the embodiments without departing from the scope and spirit of the present invention.

The adhesive tape for connecting secondary battery electrodes according to the present invention which is usable in the secondary battery industry can minimize faulty secondary battery electrodes, connect the secondary battery electrodes with each other while minimizing a bad influence on processing devices, and enhance production efficiency by realizing the automated process.

What is claimed is:

1. An adhesive tape for connecting secondary battery electrodes consisting of:
   a base film made with synthetic resin selected from polyethylene terephthalate (PET), polyethylene naphthalate (PEN), oriented polypropylene (OPP) and polyimide (PI),
   wherein said base film is 5 µm to 200 µm in thickness;
   an adhesive layer which is formed on a lower surface of the base film and is configured such that an adhesive is coated on the central portion of the base film except the right and left peripheries of the base film,
   wherein the adhesive is an acryl-based adhesive and
   wherein the adhesive layer is configured such that the adhesive is coated on the central portion of the lower surface of the base film at width which is 50% to 99% of the full lateral width of the base film,
   wherein the adhesive layer is 3 µm to 50 µm in thickness; and
   a color printed layer which is formed between the lower surface of the base film and an upper surface of the adhesive layer and has a color coated to be distinguished by a sensor, said color printed layer being of the same size as said base film
   wherein said adhesive is the only adhesive contained in said adhesive layer.

2. An adhesive tape for connecting secondary battery electrodes consisting of:
   a base film made with synthetic resin selected from polyethylene terephthalate (PET), polyethylene naphthalate (PEN), oriented polypropylene (OPP) and polyimide (PI),
   wherein said base film is 5 µm to 200 µm in thickness;
   an adhesive layer which is formed on a lower surface of the base film and is configured such that an adhesive is coated on the central portion of the base film except the right and left peripheries of the base film,
   wherein the adhesive is an acryl-based adhesive and
   wherein the adhesive layer is configured such that the adhesive is coated on the central portion of the lower surface of the base film at width which is 50% to 99% of the full lateral width of the base film,
   wherein the adhesive layer is 3 µm to 50 µm in thickness; and
   a color printed layer which is formed between the lower surface of the base film and an upper surface of the adhesive layer and has a color coated to be distinguished by a sensor, said color printed layer being of the same size as said base film
   wherein said adhesive is the only adhesive contained in said adhesive layer, and
   a release sheet or a release film which is located on the lower surface of the adhesive layer and has the same width as the base film.

3. An adhesive tape for connecting secondary battery electrodes consisting of:
   a base film made with synthetic resin selected from polyethylene terephthalate (PET), polyethylene naphthalate (PEN), oriented polypropylene (OPP) and polyimide (PI),
   wherein said base film is 5 µm to 200 µm in thickness;
   an adhesive layer which is formed on a lower surface of the base film and is configured such that an adhesive is coated on the central portion of the base film except the right and left peripheries of the base film,
   wherein the adhesive is an acryl-based adhesive and
   wherein the adhesive layer is configured such that the adhesive is coated on the central portion of the lower surface of the base film at width which is 50% to 99% of the full lateral width of the base film,
   wherein the adhesive layer is 3 µm to 50 µm in thickness; and
   a color printed layer which is formed between the lower surface of the base film and an upper surface of the adhesive layer and has a color coated to be distinguished by a sensor, said color printed layer being of the same size as said base film
   wherein said adhesive is the only adhesive contained in said adhesive layer, and
   a silicon hardening resin layer which is formed on the upper surface of the base film and is hardened by ultraviolet rays after silicon resin is coated.

* * * * *